United States Patent [19]

Bimman

[11] Patent Number: 4,484,516

[45] Date of Patent: Nov. 27, 1984

[54] CLAMP FOR PRESSING FOOD IN PAN DURING COOKING

[76] Inventor: Lev Bimman, Skogveien 117, 1320 Stabekk, Norway

[21] Appl. No.: 403,146

[22] Filed: Jul. 29, 1982

[51] Int. Cl.³ .............................................. A47J 37/10
[52] U.S. Cl. ........................................................ 99/349
[58] Field of Search .......................... 99/349, 422, 426; 220/334; 100/233

[56] References Cited

U.S. PATENT DOCUMENTS

| 2,244,145 | 6/1941 | Erickson | 99/349 X |
| 2,632,379 | 3/1953 | Kudo | 99/349 X |
| 4,123,560 | 10/1978 | Hice | 99/349 |

FOREIGN PATENT DOCUMENTS 1401764  7/1975  United Kingdom ................. 99/349

*Primary Examiner*—Billy J. Wilhite
*Attorney, Agent, or Firm*—Laurence R. Brown

[57] ABSTRACT

This apparatus is for cooking various food items under pressure, and is particularly well adapted for cooking chicken and steaks rapidly at home. A toggle link clamp mechanism is adapted to press food against the bottom of any pan, and for applying a desired variable pressure to all portions of the food, whereby rapid and high-grade cooking is accomplished. The clamp is adjustable for various pans and/or other vessles.

1 Claim, 9 Drawing Figures

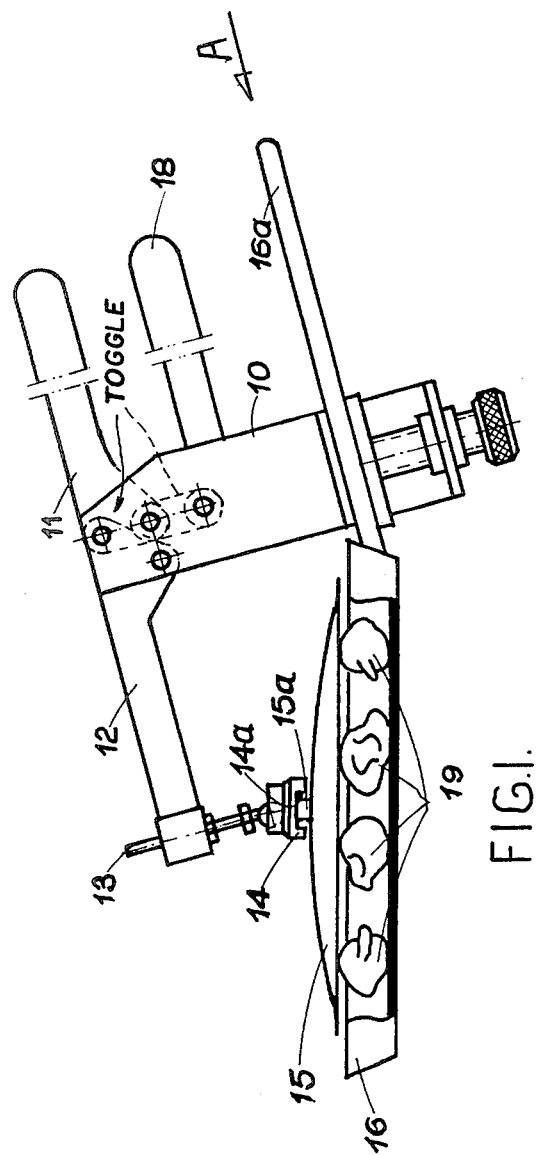
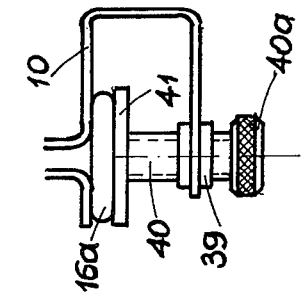
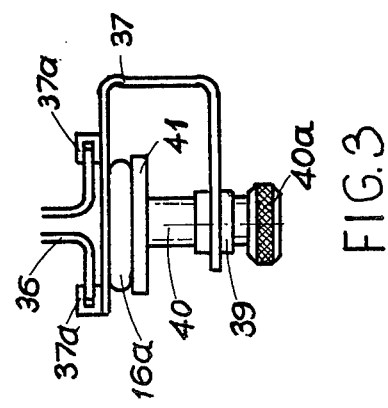

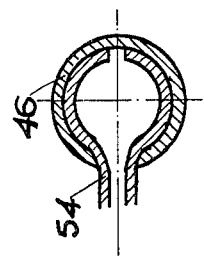
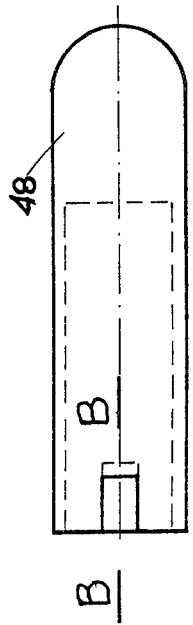
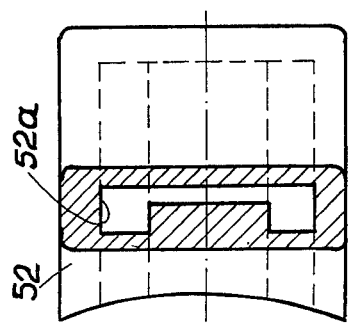
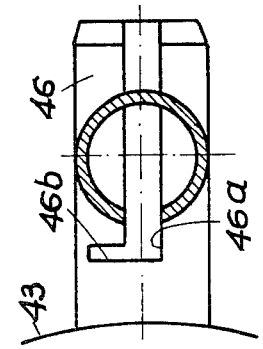
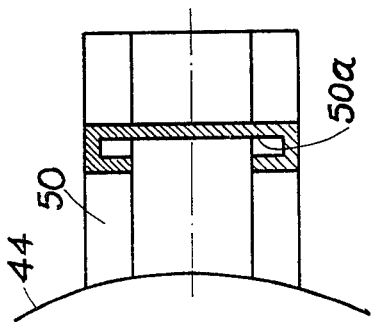

CLAMP FOR PRESSING FOOD IN PAN DURING COOKING

FIELD OF THE INVENTION

This invention relates to cooking accessories for applying pressure to all portions of the food item, whereby a rapid cooking is accomplished.

OBJECTS OF THE INVENTION

It is a primary object of the patent invention to provide cooking apparatus which is well adapted for cooking chicken and steaks rapidly at home, and wherein attachable means may be adjusted to various pans and other vessels.

Another object of the invention is to provide cooking apparatus wherein a desired pressure may be maintained at all times on the food being cooked and whereby pressure adjustments can readily be made to compensate for shrinkage during cooking and to increase the pressure as desired after the initial stages of the cooking when the food item becomes more firm.

A further object of the invention is to provide cooking apparatus wherein the pressure may be minimized to any desired extent in cooking certain soft foods requiring little or no pressure.

Still a further object of the invention is to provide pressure cooking apparatus which may be adjusted for cooking food items of different thicknesses to maintain a desired pressure regardless of thickness.

BRIEF DESCRIPTION OF THE DRAWINGS

Various other objects and advantages of the invention will hereinafter become fully apparent from the following description of the drawing, illustrating a presently preferred embodiment thereof, and wherein:

FIG. 1 is a side elevation view of the cooking apparatus of this invention attached to a pan in the clamped position;

FIG. 2 is an end elevation partial view looking from right to left along "A" of FIG. 1;

FIG. 3 is an end elevation partial view looking from right to left along "A" of FIG. 1, showing a different embodiment of the mounting means;

FIG. 4 is a top plan view of a cylindrical pan extension arm;

FIG. 5 is a top plan view of a demountable pan handle mountable on the extension arm of FIG. 4;

FIG. 6 is a fragmentary cross-vertical sectional view of the FIG. 4 extension arm;

FIG. 7 is a top plan view of a flat pan extension arm;

FIG. 8 is a top plan view of a demountable pan handle for the extension arm of FIG. 7; and FIG. 9 is a longitudinal fragment view in section, taken substantially along the line B—B of FIG. 5.

DETAILED DESCRIPTION OF THE INVENTION

In the embodiment shown in FIG. 1, the toggle link clamp mechanism includes base 10. The linkage comprises pressure handle 11, clamping arm 12 and one link, which is placed between two plates of base 10 (see dotted line on FIG. 1). Pressure handle 11 combines therewith by one common pivot pin movable with clamping arm 12 and by the second common pivot pin movable with said link. Thus, said link has a common pivot pin movable with the pressure handle 11, supported by the stationary pin, therewith positioning clamping arm 12, whereby, when the pressure handle 11 is swung upwardly, the clamping arm 12 is swung upwardly too and the toggle link clamp is in its unclamped position, and when the pressure handle 11 is swung downwardly the clamping arm 12 is swung downwardly too, and the toggle link clamp is in its clamped position. It can be seen from the position shown on FIG. 1, that along the straight vertical line are positioned three pins: the common movable pin of pressure handle 11 and clamping arm 12 is uppermost, another common movable pin of pressure handle 11 and the link is therebelow, a stationary pin of the link is lowermost and leftwards of the vertical line is shown a stationary pin for clamping arm 12.

It is to be understood that the clamping force, which is provided by the toggle link clamp is cause and effect of the elastic strain of the linkage, therefore the clamping force, provided by the toggle link clamp, may be significantly higher than the effect by application of manual efforts by pressure handle 11.

However, it should be noted, that the relative position of pins in the aforecited structure of the toggle link clamp prevents it from unclamping. In an alternate structure the toggle link clamp may be provided with a spring, which prevents it from unclamping in its clamping position.

The base 10 is provided with a supporting arm 18. The clamping arm 12 is illustrated as comprising a bolt 13 with nuts and ball socket 14, which is provided with cut 14a, being adjusted for handle 15a of cover 15.

The FIG. 2 represents fragmentarily the structure shown on FIG. 1 of the clamp formed by the bottom plates of base 10, which is provided with a nut 39, screw 40 with head 40a and clamping plate 41, for joining the toggle link clamp with various pans.

The separable fastener as shown on FIG. 3 is provided with two castellated strips 37a, in which the T-form bottom plate 36 of the toggle link clamp is suitably supported, and is also provided with nut 39, screw 40 with head 40a and clamping plate 41 for joining the toggle link clamp with a pan.

As illustrated in FIG. 4, a cylindrical pan's side arm 46 of pan 43 is provided with the hole, axial slot 46a and cross slot 46b, whereby by means of the cylindrical bottom 54 of the toggle link clamp's base plates, as best seen on FIG. 6, the toggle link clamp is suitably supported as well as the demountable handle 48 (see FIGS. 5 and 9), which is used for conventional cooking without pressure and which is provided with slot 48b and lug 48a, whereby it may be secured in place by means of moving it forwards axially and turning it from the end clockwise, whereby a lug 48 is placed into cross slot 46b.

As shown in FIG. 7, a flat pan's side arm 50 of pan 44 is provided with T-shaped groove 50a, whereby the T-shaped plate 36 (see FIG. 3) of the toggle link clamp is suitably supported so well as the demountable handle 52 (see FIG. 8), which is provided with hole 52a being conformed to pan's side arm 50, being used for conventional cooking without pressure.

The particularized structure of the invention provides the toggle link clamp mounted on the pan and with the cover 15 being coupled to bolt 13.

The cooking means thus is adapted for cooking various foods and is particularly well adapted for cooking chickens and steaks rapidly at home.

The method of using the invention is to place the food items into a frying pan or other pan and to place the cover 15 on top of the food and to mount the toggle link clamp on the pan. The toggle link clamp is in its unclamped position, when the pressure handle 11 is swung upwardly, whereby the clamping arm 12 is swung upwardly too.

The bolt 13 can be linearly adjusted to obtain the desired pressure and to support cover 15 to accommodate the food items of a desired thickness. The bolt 13 includes ball socket 14 with cut 14a for the cover's handle 15a permitting a certain amount of freedom of movement between the bolt 13 and cover 15 in order that cover 15 may adjust itself properly to the food item contained in the pan as shown clearly in FIG. 1. After the pressure handle 11 is swung downwardly, the clamping arm 12 with bolt 13 are swung downwardly to maintain a desired pressure during cooking. The desired pressure at all times during its utilization for certain other food items such as sauerkraut may be regulated by adjusting the aforesaid bolt 13 to maintain pressure when the food being cooked is essentially shrinked.

The present invention has been described in detail above for purposes of illustration only and is not intended to be limited by this description or otherwise to exclude any variation or equivalent arrangement that would be apparent from, or reasonably suggested by, the foregoing disclosure to those skilled in the art.

I claim:

1. A device for cooking various food items under pressure, comprising in combination, a pan, a removable cover fitting into said pan on top of food placed therein, and a toggle link clamp lever mechanism having a pressure handle and having two toggle positions attained by corresponding movement of said pressure handle, said toggle mechanism being coupled between said cover and said pan for moving the cover in respective positions clamped on top of food in the pan and raised from the food in the pan in response to movement of said pressure handle to the two toggle positions, adjustable pressure level means coupled between the toggle mechanism and said cover for adjusting pressure on said food exerted in the toggle position clamped on top of said food.

* * * * *